United States Patent
Huang et al.

(10) Patent No.: US 9,692,292 B2
(45) Date of Patent: Jun. 27, 2017

(54) POWER SUPPLY APPARATUS WITH ALTERNATING CURRENT POWER DETECTION CIRCUIT

(71) Applicant: Chicony Power Technology Co., Ltd., New Taipei (TW)

(72) Inventors: Wen-Nan Huang, New Taipei (TW); Shiu-Hui Lee, New Taipei (TW); Yao-Wen Tsai, New Taipei (TW); Ching-Guo Chen, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 260 days.

(21) Appl. No.: 14/643,697

(22) Filed: Mar. 10, 2015

(65) Prior Publication Data

US 2016/0126825 A1 May 5, 2016

(30) Foreign Application Priority Data

Nov. 4, 2014 (TW) .............................. 103138189 A (51) Int. Cl.
*H02M 7/217* (2006.01)
*H02M 1/14* (2006.01)
(Continued)

(52) U.S. Cl.
CPC ............. *H02M 1/143* (2013.01); *H02M 1/44* (2013.01); *H02M 7/06* (2013.01); *H02M 7/2176* (2013.01);
(Continued)

(58) Field of Classification Search
CPC .......... H02M 7/02; H02M 7/12; H02M 7/217; H02M 7/2176; H02M 1/143; H02M 1/44
See application file for complete search history.

(56) References Cited

U.S. PATENT DOCUMENTS

| | | | | |
|---|---|---|---|---|
| 4,730,245 A | * | 3/1988 | Sato | .................. H02H 3/24 363/128 |
| 4,823,227 A | * | 4/1989 | Grant | ................. H02H 3/207 327/72 |

(Continued)

FOREIGN PATENT DOCUMENTS

| | | | |
|---|---|---|---|
| CN | 103354423 A | 10/2013 | |
| CN | 103475076 A | 12/2013 | |

(Continued)

*Primary Examiner* — Fred E Finch, III
*Assistant Examiner* — Rafael O De Leon Domenech
(74) *Attorney, Agent, or Firm* — Muncy, Geissler, Olds & Lowe, P.C.

(57) ABSTRACT

A power supply apparatus includes a main power processing circuit and an alternating current power detection circuit. The alternating current power detection circuit is electrically connected to the main power processing circuit. The alternating current power detection circuit includes a rectifying unit and a frequency processing unit. The rectifying unit is electrically connected to the main power processing circuit. The frequency processing unit is electrically connected to the main power processing circuit and the rectifying unit. The rectifying unit rectifies an alternating current power to obtain a rectified power. When a frequency of the rectified power is greater than a predetermined frequency, the frequency processing unit informs the main power processing circuit, so that the main power processing circuit processes the alternating current power to obtain an output direct current power.

5 Claims, 5 Drawing Sheets

(51) Int. Cl.
    *H02M 7/06*     (2006.01)
    *H02M 1/44*     (2007.01)
    H02M 7/02     (2006.01)
    H02M 7/12     (2006.01)

(52) U.S. Cl.
    CPC .............. *H02M 7/02* (2013.01); *H02M 7/12* (2013.01); *H02M 7/217* (2013.01)

(56) References Cited

U.S. PATENT DOCUMENTS

2010/0066171 A1*   3/2010   Thakur .................. H02J 1/102
                                                                                                      307/43
2011/0249476 A1* 10/2011   Chen .................... H02H 1/0007
                                                                                                            363/52
2013/0134910 A1*   5/2013   Iwashita ................ H02P 3/14
                                                                                                             318/376

FOREIGN PATENT DOCUMENTS

| JP | H06169501 A | 6/1994 |
| JP | 2004129357 A | 4/2004 |
| JP | 2006014546 A | 1/2006 |
| JP | 2009089490 A | 4/2009 |
| JP | 2012016187 A | 1/2012 |
| JP | 2013115994 A | 6/2013 |
| JP | 2014054018 A | 3/2014 |
| TW | 200908528 A | 2/2009 |
| TW | 201009358 A | 3/2010 |
| TW | 201419730 A | 5/2014 |

\* cited by examiner

POWER SUPPLY APPARATUS WITH ALTERNATING CURRENT POWER DETECTION CIRCUIT

BACKGROUND OF THE INVENTION

Field of the Invention

The present invention relates to a power supply apparatus, and especially relates to a power supply apparatus with an alternating current power detection circuit.

Description of the Related Art

The power supply apparatus is a very common electronic apparatus. The power supply apparatus supplies power to the load apparatus to drive the load apparatus. Therefore, the power supply apparatus is very important. Usually, the power supply apparatus receives the alternating current power and converts the alternating current power into the output direct current power.

Generally speaking, the voltage range of the normal alternating current power is between 90 volts and 264 volts, and the frequency range of the normal alternating current power is between 47 Hz and 63 Hz. The power supply apparatus is damaged easily if the power supply apparatus utilizes the abnormal alternating current power (for examples, the voltage of the alternating current power is less than 90 volts or the frequency of the alternating current power is lower than 47 Hz). However, the conventional power supply apparatus does not have a good alternating current power detection circuit to avoid utilizing the abnormal alternating current power.

SUMMARY OF THE INVENTION

In order to solve the above-mentioned problems, an object of the present invention is to provide a power supply apparatus with an alternating current power detection circuit.

In order to achieve the object of the present invention mentioned above, the power supply apparatus comprises a main power processing circuit and an alternating current power detection circuit. The alternating current power detection circuit is electrically connected to the main power processing circuit. The alternating current power detection circuit comprises a rectifying unit and a frequency processing unit. The rectifying unit is electrically connected to the main power processing circuit. The frequency processing unit is electrically connected to the main power processing circuit and the rectifying unit. The rectifying unit rectifies an alternating current power to obtain a rectified power. When a frequency of the rectified power is greater than a predetermined frequency, the frequency processing unit informs the main power processing circuit, so that the main power processing circuit processes the alternating current power to obtain an output direct current power.

The advantage of the present invention is to protect the power supply apparatus from being damaged by the abnormal alternating current power.

DETAILED DESCRIPTION OF THE INVENTION

Figure 1:
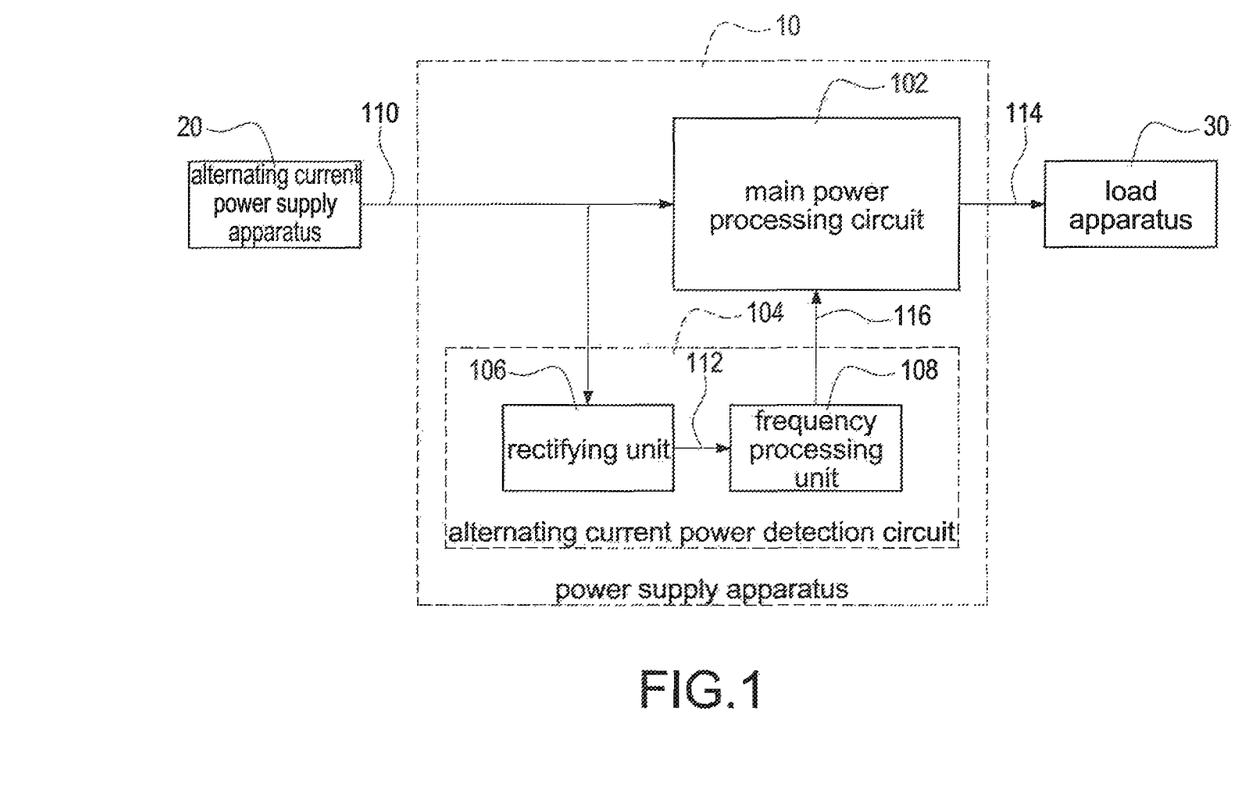
FIG. 1 shows a block diagram of the first embodiment of the power supply apparatus of the present invention.

FIG. 1 shows a block diagram of the first embodiment of the power supply apparatus of the present invention. A power supply apparatus 10 is applied to an alternating current power supply apparatus 20 and a load apparatus 30. The power supply apparatus 10 comprises a main power processing circuit 102 and an alternating current power detection circuit 104. The alternating current power detection circuit 104 comprises a rectifying unit 106 and a frequency processing unit 108.

The main power processing circuit 102 is electrically connected to the alternating current power supply apparatus 20 and the load apparatus 30. The alternating current power detection circuit 104 is electrically connected to the alternating current power supply apparatus 20 and the main power processing circuit 102. The rectifying unit 106 is electrically connected to the alternating current power supply apparatus 20 and the main power processing circuit 102. The frequency processing unit 108 is electrically connected to the main power processing circuit 102 and the rectifying unit 106.

The alternating current power supply apparatus 20 sends an alternating current power 110 to the main power processing circuit 102 and the rectifying unit 106. The alternating current power 110 is a sine wave. A voltage range of the alternating current power 110 is between 90 volts and 264 volts. A frequency range of the alternating current power 110 is between 47 Hz and 63 Hz. The rectifying unit 106 rectifies the alternating current power 110 to obtain a rectified power 112. The rectifying unit 106 sends the rectified power 112 to the frequency processing unit 108. The frequency processing unit 108 detects a frequency of the rectified power 112.

When the frequency of the rectified power 112 is greater than a predetermined frequency (for example, 47 Hz), the frequency processing unit 108 informs the main power processing circuit 102, so that the main power processing circuit 102 processes the alternating current power 110 to obtain an output direct current power 114. The main power processing circuit 102 sends the output direct current power 114 to the load apparatus 30. When the frequency of the rectified power 112 is not greater than the predetermined frequency, the frequency processing unit 108 does not inform the main power processing circuit 102, so that the main power processing circuit 102 does not process the alternating current power 110. The output direct current power 114 is not obtained.

In another word, the frequency processing unit 108 generates an input power ready signal 116 when the frequency of the rectified power 112 is greater than the predetermined frequency. The frequency processing unit 108 sends the input power ready signal 116 to the main power processing circuit 102, so that the main power processing circuit 102 processes the alternating current power 110 to obtain the output direct current power 114. The frequency processing unit 108 does not generate the input power ready signal 116 when the frequency of the rectified power 112 is not greater than the predetermined frequency. Therefore, the main power processing circuit 102 does not process the alternating current power 110. The output direct current power 114 is not obtained.

The efficiency of the rectifying unit 106 is to rectify the alternating current power 110 to obtain the rectified power 112. The frequency of the rectified power 112 detected by the frequency processing unit 108 is more accurate than a frequency of the alternating current power 110 detected by the frequency processing unit 108 directly. One of the reasons is that a current direction of the alternating current power 110 is changed alternatively.

Figure 2:
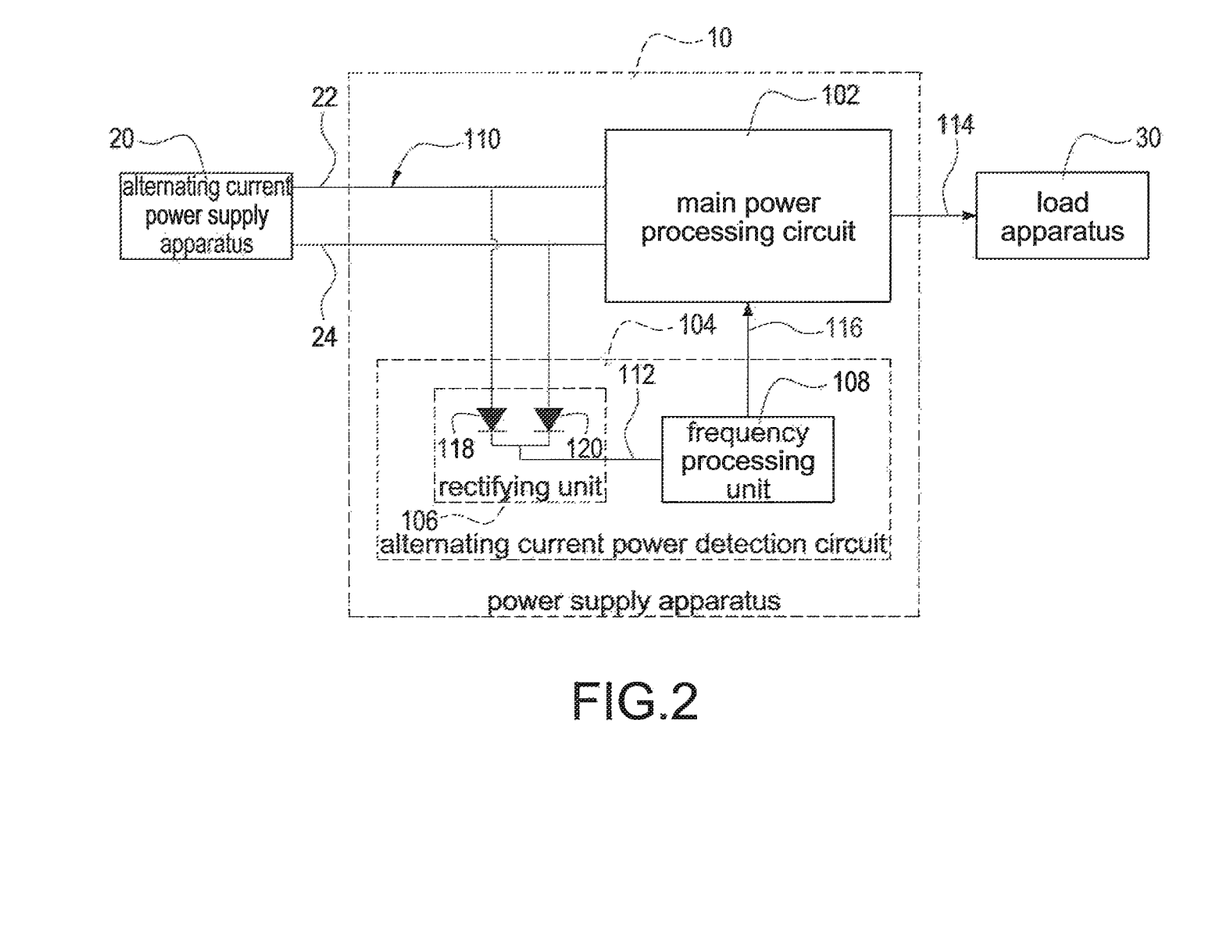
FIG. 2 shows a block diagram of the second embodiment of the power supply apparatus of the present invention.

FIG. 2 shows a block diagram of the second embodiment of the power supply apparatus of the present invention. The description for the elements shown in FIG. 2, which are similar to those shown in FIG. 1, is not repeated here for brevity. Moreover, the alternating current power supply apparatus 20 comprises a line wire 22 and a neutral wire 24.

The rectifying unit 106 comprises a first diode 118 and a second diode 120. The first diode 118 is electrically connected to the main power processing circuit 102, the frequency processing unit 108 and the line wire 22. The second diode 120 is electrically connected to the main power processing circuit 102, the frequency processing unit 108, the neutral wire 24 and the first diode 118.

In another word, an anode of the first diode 118 is connected to the main power processing circuit 102 and the line wire 22. A cathode of the first diode 118 is connected to the frequency processing unit 108. An anode of the second diode 120 is connected to the main power processing circuit 102 and the neutral wire 24. A cathode of the second diode 120 is connected to the frequency processing unit 108 and the cathode of the first diode 118.

The first diode 118 and the second diode 120 rectify the alternating current power 110 to obtain the rectified power 112. When the frequency of the rectified power 112 is greater than twice of the predetermined frequency, the frequency processing unit 108 informs the main power processing circuit 102, so that the main power processing circuit 102 processes the alternating current power 110 to obtain the output direct current power 114.

For example, a frequency range of the rectified power 112 is between 94 Hz and 126 Hz if the frequency range of the alternating current power 110 which is normal is between 47 Hz and 63 Hz, wherein the first diode 118 and the second diode 120 rectify the alternating current power 110 to obtain the rectified power 112. The twice of the predetermined frequency is 94 Hz if the predetermined frequency is 47 Hz. Therefore, if the frequency of the rectified power 112 is greater than 94 Hz (the alternating current power 110 is normal), the frequency processing unit 108 informs the main power processing circuit 102, so that the main power processing circuit 102 processes the alternating current power 110 to obtain the output direct current power 114.

The efficiency of the first diode 118 and the second diode 120 is the same with the efficiency of the rectifying unit 106. Moreover, the frequency of the rectified power 112 obtained by rectifying the alternating current power 110 by two diodes is more accurate than the frequency of the rectified power 112 obtained by rectifying the alternating current power 110 by one diode. One of the reasons is that the frequency which is thicker without interruption is more accurate when the frequency is measured.

Figure 3:
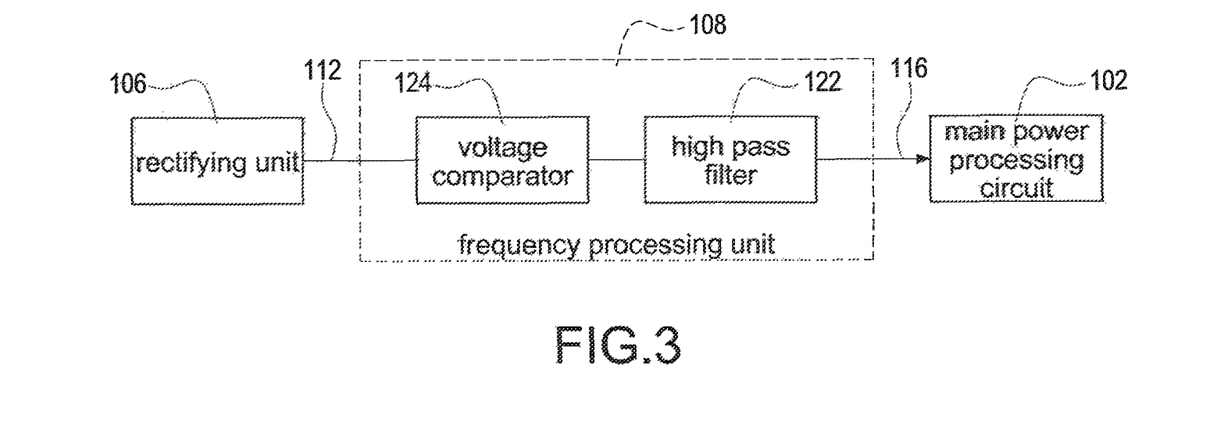
FIG. 3 shows a block diagram of the first embodiment of the frequency processing unit of the present invention.

FIG. 3 shows a block diagram of the first embodiment of the frequency processing unit of the present invention. The frequency processing unit 108 shown in FIG. 3 can be applied to FIGS. 1~2. The description for the elements shown in FIG. 3, which are similar to those shown in FIGS. 1~2, is not repeated here for brevity.

The frequency processing unit 108 comprises a high pass filter 122 and a voltage comparator 124. The high pass filter 122 is electrically connected to the main power processing circuit 102. The voltage comparator 124 is electrically connected to the high pass filter 122 and the rectifying unit 106. In another word, one side of the high pass filter 122 is connected to the main power processing circuit 102. One side of the voltage comparator 124 is connected to the other side of the high pass filter 122. The other side of the voltage comparator 124 is connected to the cathode of the first diode 118 and the cathode of the second diode 120.

The high pass filter 122 is used for determining whether the frequency of the rectified power 112 is greater than the predetermined frequency or not when the frequency processing unit 108 is applied to FIG. 1. The voltage comparator 124 is used for determining whether a voltage of the rectified power 112 is greater than a predetermined voltage (for example 90 volts) or not. When the voltage of the rectified power 112 is greater than the predetermined voltage, the voltage comparator 124 informs the high pass filter 122, so that the high pass filter 122 determines whether the frequency of the rectified power 112 is greater than the predetermined frequency or not.

The high pass filter 122 is used for determining whether the frequency of the rectified power 112 is greater than twice of the predetermined frequency or not when the frequency processing unit 108 is applied to FIG. 2. The voltage comparator 124 is used for determining whether the voltage of the rectified power 112 is greater than the predetermined voltage (for example 90 volts) or not. When the voltage of the rectified power 112 is greater than the predetermined voltage, the voltage comparator 124 informs the high pass filter 122, so that the high pass filter 122 determines whether the frequency of the rectified power 112 is greater than twice of the predetermined frequency or not.

Figure 4:
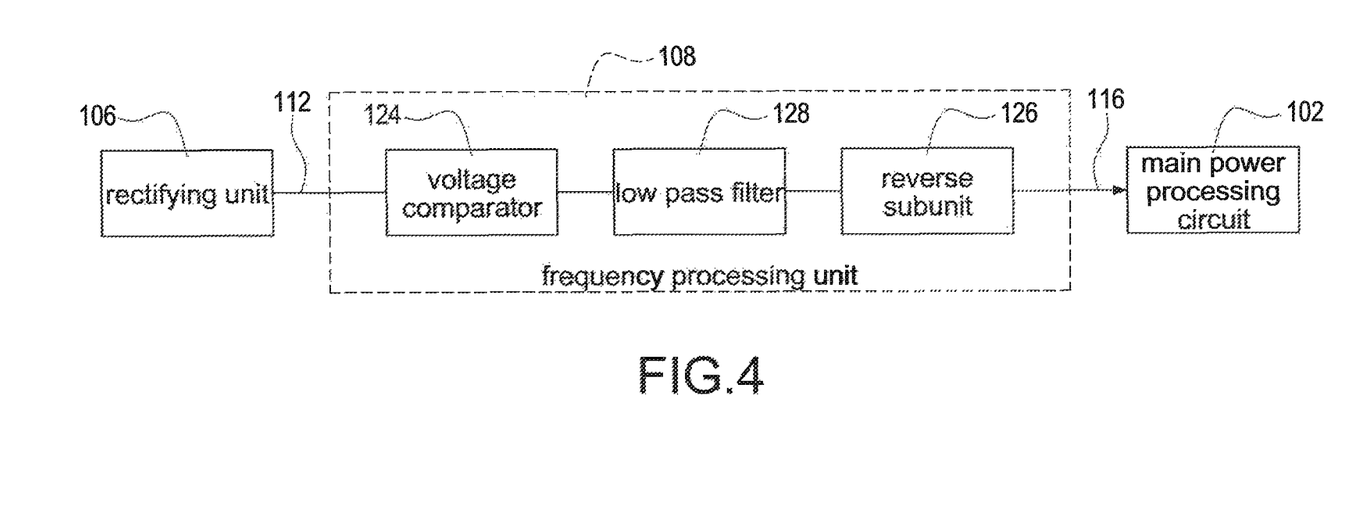
FIG. 4 shows a block diagram of the second embodiment of the frequency processing unit of the present invention.

FIG. 4 shows a block diagram of the second embodiment of the frequency processing unit of the present invention. The frequency processing unit 108 shown in FIG. 4 can be applied to FIGS. 1~2. The description for the elements shown in FIG. 4, which are similar to those shown in FIGS. 1~2, is not repeated here for brevity.

The frequency processing unit 108 comprises a reverse subunit 126, a low pass filter 128 and a voltage comparator 124. The reverse subunit 126 is electrically connected to the main power processing circuit 102. The low pass filter 128 is electrically connected to the reverse subunit 126. The voltage comparator 124 is electrically connected to the low pass filter 128 and the rectifying unit 106.

In another word, one side of the reverse subunit 126 is connected to the main power processing circuit 102. One side of the low pass filter 128 is connected to the other side of the reverse subunit 126. One side of the voltage comparator 124 is connected to the other side of the low pass filter 128. The other side of the voltage comparator 124 is connected to the cathode of the first diode 118 and the cathode of the second diode 120.

The efficiency of the low pass filter 128 and the reverse subunit 126 is the same with a high pass filter. The reverse subunit 126 is a NOT gate.

The low pass filter 128 and the reverse subunit 126 are used for determining whether the frequency of the rectified power 112 is greater than the predetermined frequency or not when the frequency processing unit 108 is applied to FIG. 1. The voltage comparator 124 is used for determining whether a voltage of the rectified power 112 is greater than a predetermined voltage (for example 90 volts) or not. When the voltage of the rectified power 112 is greater than the predetermined voltage, the voltage comparator 124 informs the low pass filter 128, so that the low pass filter 128 and the reverse subunit 126 determine whether the frequency of the rectified power 112 is greater than the predetermined frequency or not.

The low pass filter 128 and the reverse subunit 126 are used for determining whether the frequency of the rectified power 112 is greater than twice of the predetermined frequency or not when the frequency processing unit 108 is applied to FIG. 2. The voltage comparator 124 is used for determining whether the voltage of the rectified power 112 is greater than the predetermined voltage (for example 90 volts) or not. When the voltage of the rectified power 112 is greater than the predetermined voltage, the voltage comparator 124 informs the low pass filter 128, so that the low pass filter 128 and the reverse subunit 126 determine whether the frequency of the rectified power 112 is greater than twice of the predetermined frequency or not.

Figure 5:
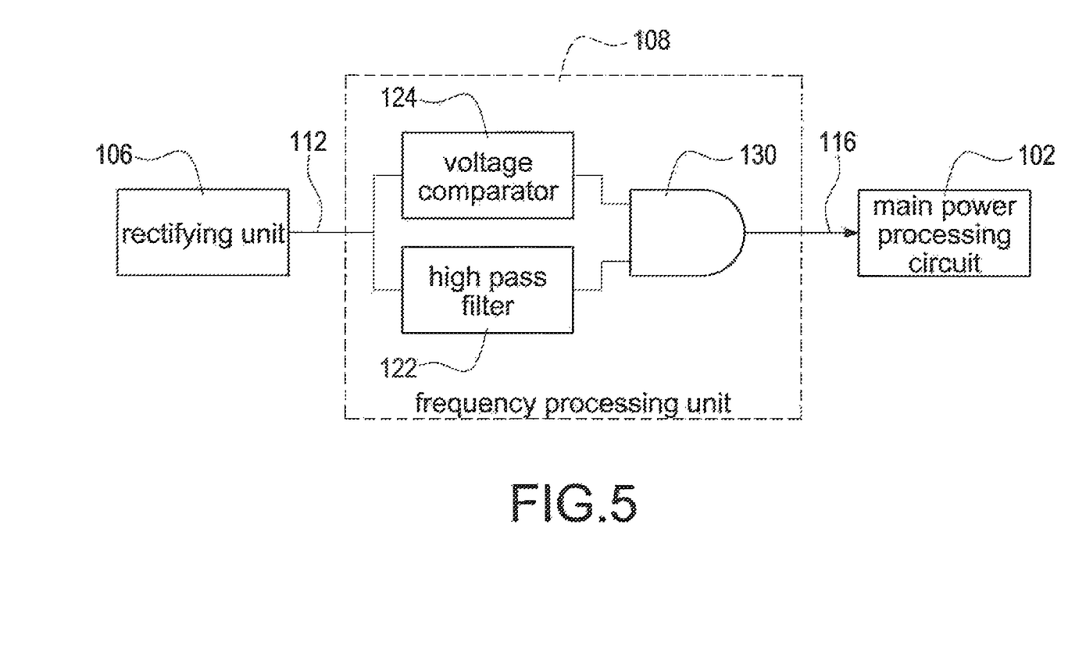
FIG. 5 shows a block diagram of the third embodiment of the frequency processing unit of the present invention.

FIG. 5 shows a block diagram of the third embodiment of the frequency processing unit of the present invention. The frequency processing unit 108 shown in FIG. 5 can be applied to FIGS. 1~2. The description for the elements shown in FIG. 5, which are similar to those shown in FIGS. 1~2, is not repeated here for brevity.

The frequency processing unit 108 comprises an AND gate 130, a high pass filter 122 and a voltage comparator 124. The AND gate 130 is electrically connected to the main power processing circuit 102. The high pass filter 122 is electrically connected to the AND gate 130 and the rectifying unit 106. The voltage comparator 124 is electrically connected to the AND gate 130, the rectifying unit 106 and the high pass filter 122.

In another word, an output side of the AND gate 130 is connected to the main power processing circuit 102. One side of the high pass filter 122 is connected to a first input side of the AND gate 130. The other side of the high pass filter 122 is connected to the cathode of the first diode 118 and the cathode of the second diode 120. One side of the voltage comparator 124 is connected to a second input side of the AND gate 130. The other side of the voltage comparator 124 is connected to the cathode of the first diode 118, the cathode of the second diode 120 and the other side of the high pass filter 122.

The high pass filter 122 is used for determining whether the frequency of the rectified power 112 is greater than the predetermined frequency or not when the frequency processing unit 108 is applied to FIG. 1. The voltage comparator 124 is used for determining whether a voltage of the rectified power 112 is greater than a predetermined voltage (for example 90 volts) or not. According to the AND gate 130, when the frequency of the rectified power 112 is greater than the predetermined frequency and the voltage of the rectified power 112 is greater than the predetermined voltage, the AND gate 130 informs the main power processing circuit 102, so that the main power processing circuit 102 processes the alternating current power 110 to obtain the output direct current power 114.

The high pass filter 122 is used for determining whether the frequency of the rectified power 112 is greater than twice of the predetermined frequency or not when the frequency processing unit 108 is applied to FIG. 2. The voltage comparator 124 is used for determining whether the voltage of the rectified power 112 is greater than the predetermined voltage (for example 90 volts) or not. According to the AND gate 130, when the frequency of the rectified power 112 is greater than twice of the predetermined frequency and the voltage of the rectified power 112 is greater than the predetermined voltage, the AND gate 130 informs the main power processing circuit 102, so that the main power processing circuit 102 processes the alternating current power 110 to obtain the output direct current power 114.

Figure 6:
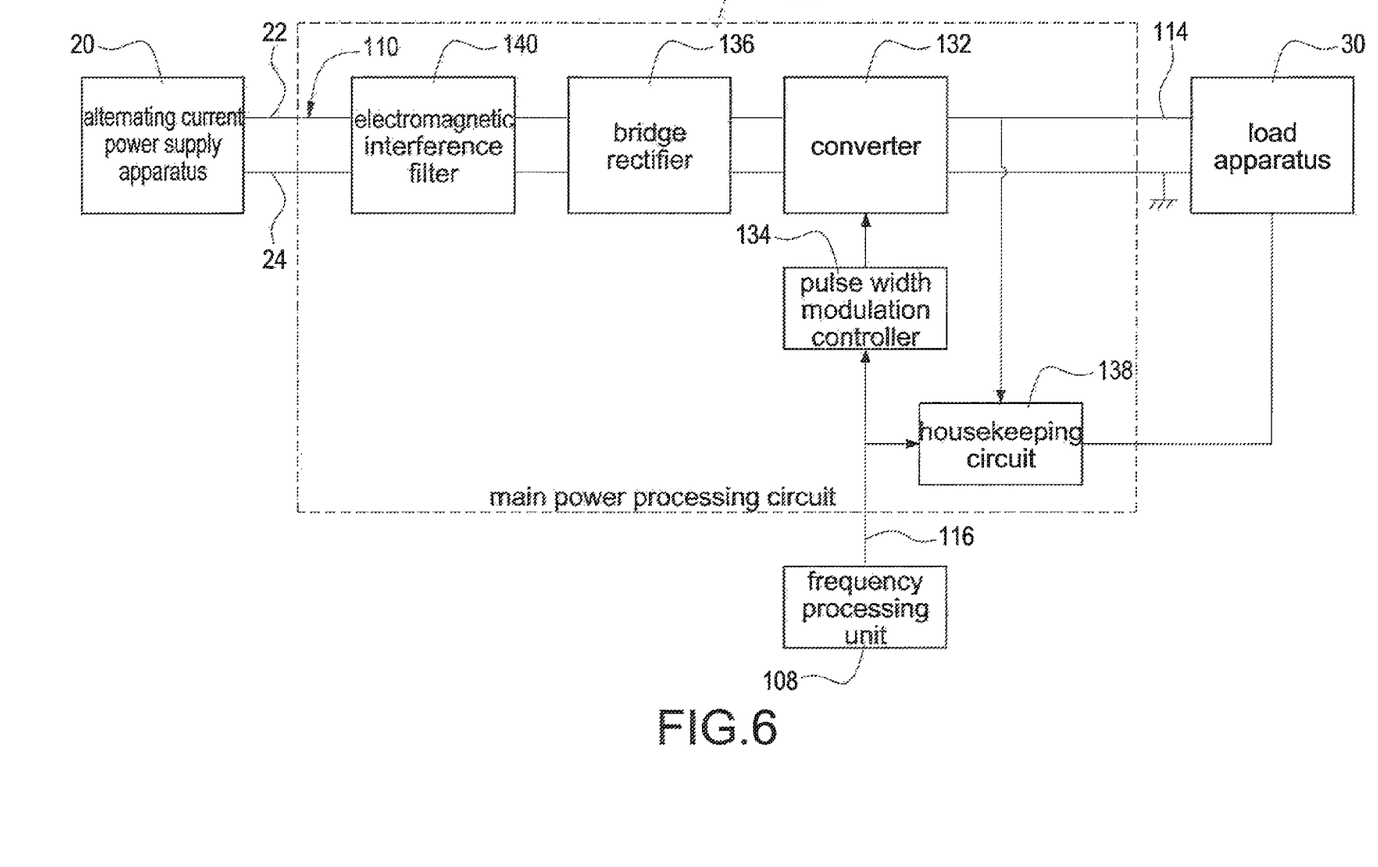
FIG. 6 shows a block diagram of the main power processing circuit of the present invention.

FIG. 6 shows a block diagram of the main power processing circuit of the present invention. The main power processing circuit 102 shown in FIG. 6 can be applied to FIGS. 1~5. The description for the elements shown in FIG. 6, which are similar to those shown in FIGS. 1~5, is not repeated here for brevity. The main power processing circuit 102 comprises a converter 132, a pulse width modulation controller 134, a bridge rectifier 136, a housekeeping circuit 138 and an electromagnetic interference filter 140.

The converter 132 is electrically connected to the load apparatus 30. The pulse width modulation controller 134 is electrically connected to the converter 132 and the frequency processing unit 108. The bridge rectifier 136 is electrically connected to the converter 132. The housekeeping circuit 138 is electrically connected to the converter 132, the frequency processing unit 108, the pulse width modulation controller 134 and the load apparatus 30. The electromagnetic interference filter 140 is electrically connected to the bridge rectifier 136 and the alternating current power supply apparatus 20.

When the main power processing circuit 102 is applied to FIG. 1 and the frequency of the rectified power 112 is greater than the predetermined frequency, the frequency processing unit 108 informs the pulse width modulation controller 134, so that the pulse width modulation controller 134 controls the converter 132 to convert the alternating current power 110 into the output direct current power 114.

When the main power processing circuit 102 is applied to FIG. 2 and the frequency of the rectified power 112 is greater than twice of the predetermined frequency, the frequency processing unit 108 informs the pulse width modulation controller 134, so that the pulse width modulation controller 134 controls the converter 132 to convert the alternating current power 110 into the output direct current power 114.

Moreover, whether the voltage of the rectified power 112 is greater than the predetermined voltage or not shall be considered when the main power processing circuit 102 is applied to FIGS. 3~5. The description for the contents, which are similar to those shown in FIGS. 3~5, is not repeated here for brevity.

Moreover, when the frequency processing unit 108 does not inform the main power processing circuit 102 so that the main power processing circuit 102 does not process the alternating current power 110, the housekeeping circuit 138 sends an abnormal signal to the load apparatus 30, so that the load apparatus 30 decreases the required power, or shuts down and so on.

The advantage of the present invention is to protect the power supply apparatus from being damaged by the abnormal alternating current power.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply apparatus, the power supply apparatus applied to an alternating current power supply apparatus, the alternating current power supply apparatus comprising a line wire and a neutral wire, and comprising:
 a main power processing circuit; and
 an alternating current power detection circuit electrically connected to the main power processing circuit,
 wherein the alternating current power detection circuit comprises:
a rectifying unit electrically connected to the main power processing circuit; and
 a frequency processing unit electrically connected to the main power processing circuit and the rectifying unit,
 wherein the rectifying unit comprises:
 a first diode electrically connected to the main power processing circuit, the frequency processing unit and the line wire; and
 a second diode electrically connected to the main power processing circuit, the frequency processing unit, the neutral wire and the first diode,
 wherein the first diode and the second diode rectify the alternating current power to obtain the rectified power; when the frequency of the rectified power is greater than twice the predetermined frequency, the frequency processing unit informs the main power processing circuit, so that the main power processing circuit processes the alternating current power to obtain the output direct current power;
 wherein the rectifying unit rectifies an alternating current power to obtain a rectified power; when a frequency of the rectified power is greater than a predetermined frequency, the frequency processing unit informs the main power processing circuit, so that the main power processing circuit processes the alternating current power to obtain an output direct current power,
 wherein when the frequency of the rectified power is not greater than the predetermined frequency, the frequency processing unit does not inform the main power processing circuit, so that the main power processing circuit does not process the alternating current power; the output direct current power is not obtained;
 wherein the frequency processing unit comprises:
a high pass filter electrically connected to the main power processing circuit, and
 a voltage comparator electrically connected to the high pass filter and the rectifying unit,
 wherein the high pass filter is used for determining whether the frequency of the rectified power is greater than twice the predetermined frequency or not;
 wherein the voltage comparator is used for determining whether a voltage of the rectified power is greater than a predetermined voltage or not; when the voltage of the rectified power is greater than the predetermined voltage, the voltage comparator informs the high pass filter, so that the high pass filter determines whether the frequency of the rectified power is greater than twice of the predetermined frequency or not.

2. The power supply apparatus in claim 1, wherein the main power processing circuit comprises:
 a converter electrically connected to a load apparatus; and
 a pulse width modulation controller electrically connected to the converter and the frequency processing unit
 wherein when the frequency of the rectified power is greater than twice of the predetermined frequency, the frequency processing unit informs the pulse width modulation controller, so that the pulse width modulation controller controls the converter to convert the alternating current power into the output direct current power.

3. The power supply apparatus in claim 2, wherein the main power processing circuit further comprises:
 a bridge rectifier electrically connected to the converter;
 a housekeeping circuit electrically connected to the converter, the frequency processing unit, the pulse width modulation controller and the load apparatus; and
 an electromagnetic interference filter electrically connected to the bridge rectifier and the alternating current power supply apparatus.

4. A power supply apparatus, the power supply apparatus applied to an alternating current power supply apparatus, the alternating current power supply apparatus comprising a line wire and a neutral wire, and comprising:
 a main power processing circuit; and
 an alternating current power detection circuit electrically connected to the main power processing circuit,
 wherein the alternating current power detection circuit comprises:
 a rectifying unit electrically connected to the main power processing circuit; and
 a frequency processing unit electrically connected to the main power processing circuit and the rectifying unit,
 wherein the rectifying unit comprises:
 a first diode electrically connected to the main power processing circuit, the frequency processing unit and the line wire; and
 a second diode electrically connected to the main power processing circuit, the frequency processing unit, the neutral wire and the first diode,
 wherein the first diode and the second diode rectify the alternating current power to obtain the rectified power; when the frequency of the rectified power is greater than twice the predetermined frequency, the frequency processing unit informs the main power processing circuit, so that the main power processing circuit processes the alternating current power to obtain the output direct current power; and
 wherein the rectifying unit rectifies an alternating current power to obtain a rectified power; when a frequency of the rectified power is greater than a predetermined frequency, the frequency processing unit informs the main power processing circuit, so that the main power processing circuit processes the alternating current power to obtain an output direct current power,
 wherein when the frequency of the rectified power is not greater than the predetermined frequency, the frequency processing unit does not inform the main power processing circuit, so that the main power processing circuit does not process the alternating current power; the output direct current power is not obtained;
 wherein the frequency processing unit comprises:
 a reverse subunit electrically connected to the main power processing circuit;
 a low pass filter electrically connected to the reverse subunit, and
 a voltage comparator electrically connected to the low pass filter and the rectifying unit,
 wherein the low pass filter and the reverse subunit are used for determining whether the frequency of the rectified power is greater than twice the predetermined frequency or not;
 wherein the voltage comparator is used for determining whether a voltage of the rectified power is greater than a predetermined voltage or not; when the voltage of the rectified power is greater than the predetermined voltage, the voltage comparator informs the low pass filter, so that the low pass filter and the reverse subunit determine whether the frequency of the rectified power is greater than twice the predetermined frequency or not.

5. A power supply apparatus, the power supply apparatus applied to an alternating current power supply apparatus, the alternating current power supply apparatus comprising a line wire and a neutral wire, and comprising:

a main power processing circuit; and an alternating current power detection circuit electrically connected to the main power processing circuit, wherein the alternating current power detection circuit comprises:

a rectifying unit electrically connected to the main power processing circuit; and a frequency processing unit electrically connected to the main power processing circuit and the rectifying unit, wherein the rectifying unit comprises:

a first diode electrically connected to the main power processing circuit, the frequency processing unit and the line wire; and a second diode electrically connected to the main power processing circuit, the frequency processing unit, the neutral wire and the first diode, wherein the first diode and the second diode rectify the alternating current power to obtain the rectified power; when the frequency of the rectified power is greater than twice of the predetermined frequency, the frequency processing unit informs the main power processing circuit, so that the main power processing circuit processes the alternating current power to obtain the output direct current power;

wherein the rectifying unit rectifies an alternating current power to obtain a rectified power; when a frequency of the rectified power is greater than a predetermined frequency, the frequency processing unit informs the main power processing circuit, so that the main power processing circuit processes the alternating current power to obtain an output direct current power, wherein when the frequency of the rectified power is not greater than the predetermined frequency, the frequency processing unit does not inform the main power processing circuit, so that the main power processing circuit does not process the alternating current power; the output direct current power is not obtained;

wherein the frequency processing unit comprises:

an AND gate electrically connected to the main power processing circuit;

a high pass filter electrically connected to the AND gate and the rectifying unit; and a voltage comparator electrically connected to the AND gate, the rectifying unit and the high pass filter, wherein the high pass filter is used for determining whether the frequency of the rectified power is greater than twice the predetermined frequency or not; the voltage comparator is used for determining whether a voltage of the rectified power is greater than a predetermined voltage or not; according to the AND gate, when the frequency of the rectified power is greater than twice the predetermined frequency and the voltage of the rectified power is greater than the predetermined voltage, the AND gate informs the main power processing circuit, so that the main power processing circuit processes the alternating current power to obtain the output direct current power.

* * * * *